United States Patent [19]

Arends et al.

[11] 4,255,382
[45] Mar. 10, 1981

[54] THERMOFORMING MACHINE WITH AUTOMATICALLY MECHANICALLY OPERATED WEB STRIPPING ELEMENT

[75] Inventors: Albert W. Arends; Ronald E. Henke, both of Gladwin, Mich.

[73] Assignee: Leesona Corporation, Beaverton, Mich.

[21] Appl. No.: 131,880

[22] Filed: Mar. 20, 1980

[51] Int. Cl.³ .................. B29C 17/00; B29C 7/00
[52] U.S. Cl. .................. 264/544; 425/387.1; 425/388; 425/394; 425/398; 425/436 R; 425/422; 425/214
[58] Field of Search ............. 425/387.1, 388, 394, 425/398, 406, 410, 411, 436, 451.4, 451.2, 416, 422, 214; 264/544

[56] References Cited

U.S. PATENT DOCUMENTS

| | | | |
|---|---|---|---|
| 2,717,421 | 9/1955 | Beeson | 425/406 X |
| 3,132,378 | 5/1964 | Johannigman | 425/436 X |
| 3,376,607 | 4/1968 | Brown | 425/422 X |
| 3,635,617 | 1/1972 | Hara et al. | 425/406 X |
| 3,764,051 | 10/1973 | Pinto et al. | 425/388 X |
| 3,880,561 | 4/1975 | Ferro | 425/368 X |
| 4,105,386 | 8/1978 | Thiel et al. | 425/387.1 X |
| 4,105,736 | 8/1978 | Padovani | 425/398 X |
| 4,158,539 | 6/1979 | Arenda et al. | 425/394 X |

*Primary Examiner*—J. Howard Flint, Jr.
*Attorney, Agent, or Firm*—Learman & McCulloch

[57] ABSTRACT

In differential pressure synthetic plastics thermoforming machinery, mold support assemblies mounted on a frame have relative movement between a mold open and a mold closed position. Power operated mechanism is provided for axially moving at least the female mold support assembly, and the female mold on the assembly which carries a stripper element mounted for relative movement with the mold. Mechanism is provided for automatically latching the stripper element to the frame as the female mold moves toward mold closed position, and abutments are provided on the mold support assembly and latch for automatically unlatching it only after the female mold has withdrawn a predetermined distance in its movement toward mold open position.

12 Claims, 3 Drawing Figures

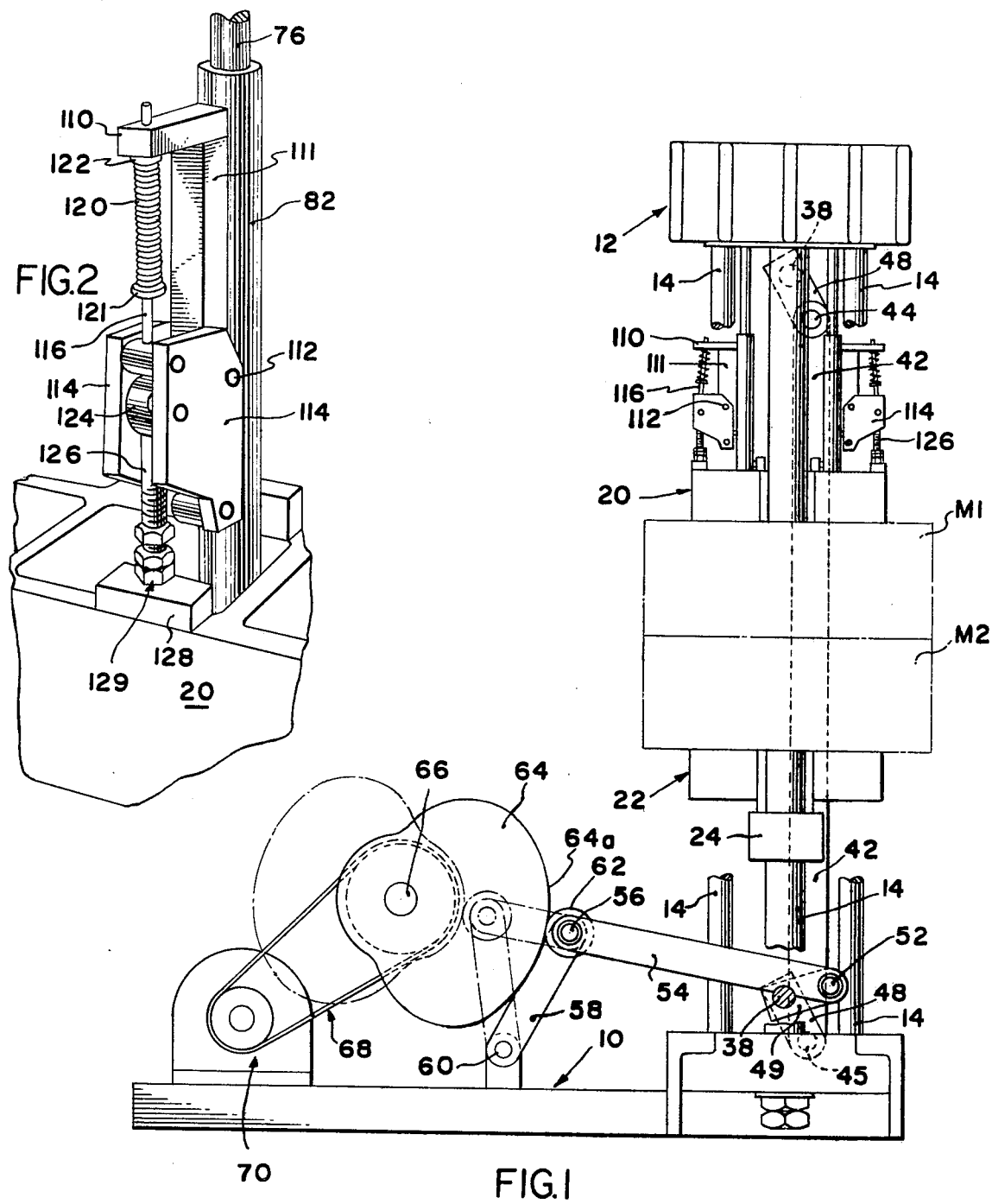

THERMOFORMING MACHINE WITH AUTOMATICALLY MECHANICALLY OPERATED WEB STRIPPING ELEMENT

BACKGROUND OF THE INVENTION

The present invention is especially directed to thermoforming machinery of the type in which mold carrying platens are moved cyclically between open and closed positions to differential pressure form parts in heated synthetic plastic webs on a mass production basis. Such machinery includes a female mold into which portions of the plastic web have been moved to conform to the contour of the mold cavity and their shape is such that a positive stripping of the entire web from the mold cavities is a necessity. Applicants are aware of cylinder operated stripper mechanisms, and also mechanically operated stripper mechanisms of the type disclosed in the present assignee's U.S. Pat. No. 3,376,607. The present improved stripper construction is especially directed to a positively acting stripper which is locked to the frame when the molds are in mold closed position, and until the female mold has been withdrawn a predetermined distance prior to being unlatched so that it may accompany the female mold as it continues to withdraw.

A further object of the invention is to provide an economically constructed, more reliable stripper subassembly which may be applied to existing machines in the field, as well as to presently manufactured machinery.

SUMMARY OF THE INVENTION

Mold support assemblies mounted on a frame have relative movement between a mold open and mold closed position. Power operated mechanism is provided for axially moving at least the female mold support assembly, and the female mold on the assembly which carries a stripper element mounted for relative movement with the mold. Mechanism is provided for latching the stripper element to the frame as the female mold moves toward mold closed position, and unlatching it only after the female mold has withdrawn a predetermined distance in its movement toward mold open position.

Other objects and advantages of the invention will be pointed out specifically or will become apparent from the following description when it is considered in conjunction with the appended claims and the accompanying drawings, wherein:

FIG. 1 is a side elevational view of a partly schematic nature showing the improved stripper mechanism mounted on the thermoforming machine, the molds being shown in mold closed position;

FIG. 2 is a greatly enlarged, perspective view of the stripper latching mechanism in particular;

Figure 3:
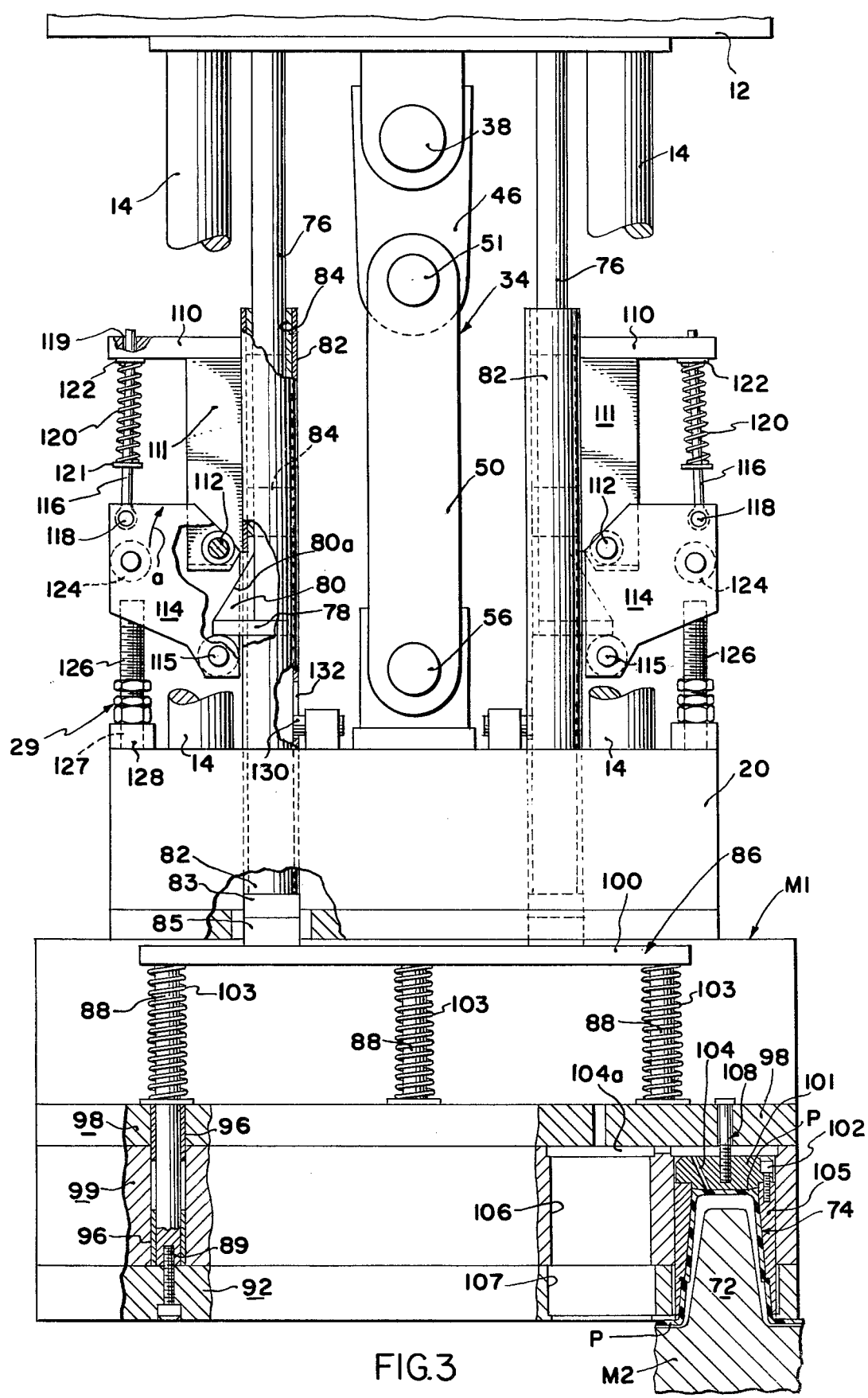
FIG. 3 is an enlarged, partly sectional, side elevational view of a fragmentary nature showing the stripper elements in position on a thermoforming machine in which the mold elements are in mold closed position.

Referring now more particularly to the accompanying drawings, and in the first instance to FIG. 1, it is to be understood that the mechanism to be described is to be mounted on a differential pressure thermoforming machine of he character disclosed in the present assignee's U.S. Pat. No. 4,158,539 which is incorporated herein by reference. In this patent, the machine includes a stationary base designated generally 10, and an upper frame member designated generally 12, which is supported above the base 10 by fixed vertical posts, such as shown at 14. Upper and lower mold carrying platens or mold support assemblies 20 and 22, respectively, are slidably mounted upon the posts 14 and bearing assemblies are provided for that purpose, such as shwon, for instance, at 24. The vertical positioning of the upper and lower platens 20 and 22 upon the vertical posts 14 is accomplished with upper and lower toggle link assemblies generally designated 34 (see FIG. 3). In the case of both upper and lower toggle assemblies, a rock shaft 38 is provided which attaches to and is journaled by the frame member 12. Toggle links 46 are fixedly secured to the rock shaft 38 for rotation with shaft 38, while similar toggle links 50, connected to links 46 by pivot pins 51 are pivotally connected by pivot pins 56 to the platen assembly 20 or 22. While only the upper toggle link assembly has been shown and described, it is to be understood that the toggle link assembly which is connected between the lower platen 22 and the base 10 is of similar or identical construction.

To move the platens 20 and 22 from their mold open position to the mold closed position shown in FIGS. 1 and 3, the upper and lower rock shafts 38 are driven in partial rotation. Coordination of the rotation of the upper and lower rock shafts 38 is accomplished by an elongate connecting link 42 (FIG. 1) which is pivotally connected at its opposite ends as at 44 and 45 to upper and lower drive cranks 46 and 48 respectively.

To drive the rock shafts 38, a main drive crank 49 is fixedly mounted on lower rock shaft 38 and is povitally connected by a pivot pin 52 to a main drive link 54. The opposite end of drive link 54 is coupled by a pin 56 to a support link 58 whose opposite end is pivotally supported upon the machine base as at 60. A cam follower roller 62 is rotatably supported on pivot pin 56 and engages the peripheral surface of a drive cam 64 fixedly mounted on a cam shaft 66 mounted for rotation about a fixed axis by a suitable means, not shown, upon base 10. The cam shaft 66 is driven in rotation by suitable mechanism such as a belt and pulley connection, generally designated 68, via a variable speed drive designated generally 70.

The surface of cam 64 is so configured as to drive the upper and lower rock shafts 38 in rotary oscillation to shift platens 20 and 22 between their mold open and mold closed positions and to maintain the mold support assemblies in their open and closed positions for selected periods of time as described in the aforementioned U.S. Pat. No. 4,158,539. The maintenance of the platens 20 and 22 in a stationary open, or closed, position is accomplished by constant radius sections of the cam 64. When roller 62 is engaged with the dwell section 64a of cam 64, the upper and lower platens 20 and 22 are maintained in their mold closed position for a period of time. The motor 70 and cam 64 are driven in constant rotation as described in the patent mentioned, but the time during which particular portions of the cycle occur is variable to suit molding conditions and the plastic material being molded, as described in the patent mentioned.

As FIG. 3 indicates, upper mold M1 is fixed to the upper platen 20 and, as FIG. 1 indicates, the lower mold M2 is likewise fixed to the lower platen 22, the lower mold M2, which is only fragmentarily shown in FIG. 3, being provided with the usual plug assist members 72, as shown in FIG. 3, which are adapted to extend up into the mold cavities 74 when the molds M1 and M2 are in mold closed position. While the platen 22 and mold M2 have been indicated to be of a movable nature, it is, of course, possible that they could be axially fixed, and only movement of the platen 20 and mold M1 might occur.

Mounted as guides which extend partway between the upper frame part 12, and platen 20, in suitable positions are dependent rods 76. The lower ends of rods 76 are provided with laterally extending base plates 79, and it will be seen that triangular cam plates 80, connecting rods 76 and bases 78, are also provided. Telescopically received on each fixed rod 76 is a guide tube 82, mounting slide bearings 84, and it is to be noted that the sleeve 82, which moves upwardly and downwardly relative to rod 76, extends below the rod 76 and through platen 20 into engagement with a stripper sub-frame 86 provided in mold assembly M1. Frame 86, which has pressurepads 85 engaged by the bases 83 of all of the sleeves 82, carries a series of dependent posts 88 connected at their lower ends by screws 89 to plastic web engaging stripper frame 92.

The posts 88 are slidable in bushings 96 provided in mold M1 frame elements 98 and 99, fixed on mold M1, and springs 103 are provided as shown to tend to normally urge the stripper plate 92 into a position of engagement with the mold part 99. The mold cavities 74 are conventionally constructed and may include sleeves 105, configures internally to the desired contour, received in mold cavity openings 106 and 107 provided in the members 99 and 92, respectively. The sleeves 105 are secured to end walls 101 by screws 102, and the mold assembly is anchored by bolt assemblies 108 to the mold frame member 98. Vacuum ports 104 connect to vacuum manifold 104a in the usual manner.

Connected with each sleeve 82 near its upper end, is a support bar 110, and a dependent plate 111, mounting a pivot pin 112 on which a pair of generally pentagonally-shaped latch plates 114 are pivotally received. Each set of plates 114 carries a lock roller 115. A rod member 116, dependent from each bar 110 and connected to latch plates 114 at 118, normally supports the latch plates 114 in the position shown in FIG. 2. However, pin 116 is slidably received in a opening 119 provided in bar 110, and latch plate 114 can pivot clockwisely in the direction of arrow a in FIG. 2, in a movement which is opposed by a return coil spring 120, provided between an abutment 121 on pin 116 and an abutment 122 provided on the bar 110.

Mounted on the platen and mold assembly so as to be vertically adjustable with respect to an abutment roller 124, carried by latch plates 114, is an abutment screw 126. The screw 126, which has axial adjustment in a threaded opening 127 in mount 128 can be secured in adjusted position by a lock nut assembly, generally designated 129. When platen 20 and mold M1 are moved upwardly to mold open position, and sleeves 82 ride upwardly on fixed guide posts 76, the sleeves 82 are prevented from rotating by projecting pins 130 (on platen 20) which ride in slots 132 provided in the sleeves 82. As many latch plate assemblies and locks of the nature shown at 114 and 78 may be provided as desired, and the construction of each will be as described.

THE OPERATION

In operation, it is initially desired to move the mold M1 away from the plastic web P without carrying the plastic web P with it. With pivoting of the rock shaft 38 and contraction of the linkage 46, 50, the platen 20 and mold M1 are moved upwardly. Initially, latch lock rollers 115 are, however, engaged under the stop ledges 78 and prevent stripper frame 86 from moving upwardly. After a predetermined time, the abutments 126 engage the latch abutments 124 and pivot the latches 114 in the clockwise direction a to release the roller abutments 115 from their locked position (shown in FIG. 3). At this time springs 103, which have been compressed by the upward movement of mold frame member 98 relative to stripper frame top plate 100, quickly snap the stripper element 98 from the removed position up into a position adjacent, and in abutting engagement with, the mold plate 99. With this, the sleeves 82 and stripper element 92 are free to ride upwardly with the mold M1 to mold open position.

During the next cycle, when platen 20 and mold M1 are being lowered to mold closed position, the sleeves 82 will move downwardly until such time as the rollers 115 strike the inclined surfaces 80a of the cam plates 80. When this occurs, pivoting of latch plates 114 about pivot pins 112 in the opposite counterclockwise direction occurs until such time as the rollers 115 reach the lower surfaces of stop plates 78 and springs 120, which have been distended, swing them sharply in under the stop ledges 78 to a locked position in which stripper element 92 is locked to the frame.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

We claim:

1. In a differential pressure thermoforming machine having a frame; mold assemblies mounted thereon for relative movement along an axis between a mold open and a mold closed position; one of said assemblies having a female mold with a mold cavity; means for feeding a heated deformable plastic web to be formed between said mold assemblies and adjacent said mold when the latter are in a mold open position; a stripper element for the female mold for restraining the web from moving with the female mold when the latter is moved toward mold open position; a stop supported by said frame; a latch carried by said stripper and movable through a path of travel from a withdrawn position to a stop engaging position in which the latch and stripper are initially prevented by the stop from moving in the withdrawal path of the female mold; and mechanism carried by the female mold assembly operable to effect movement of the latch to withdrawn position after a predetermined axial withdrawal of the female mold wherein the web is stripped from the mold to permit the stripped element to commence to move with the female mold assembly.

2. The invention defined in claim 1 wherein the latch is a bell crank mounted for pivotal movement in the plane of the stop from a latched position underlying said stop to a withdrawn position out of axial alignment with the stop.

3. The invention defined in claim 2 wherein the latch has a roller for engaging under the stop and the stop has an outwardly inclined surface engaged by the roller when the latch and mold are moving toward mold closed position for pivoting the latch outwardly and then releasing it so the roller can swing in under the stop to locked position.

4. The invention defined in claim 3 wherein means is provided to normally urge the latch to locked position.

5. The invention defined in claim 2 wherein the mechanism operable for withdrawing the latch includes an abutment on said latch and an abutment on said female mold assembly which are in axially spaced apart relation when the mold assemblies are in mold closed position, and which pivot said latch to withdrawn position when the abutment on the female mold assembly engages the latch abutment to pivot the latch to a withdrawn position wherein the stripper element is released to move with the female mold assembly and the latch is free to move axially with the stripper element to an axial position withdrawn axially from said stop.

6. The invention defined in claim 5 wherein said abutment on the female mold assembly comprises an axially adjustable pin extending axially from the female mold assembly.

7. The invention defined in any of claims 1-5 wherein the female mold carries the stripper element which comprises a stripper frame mounted for relative axial movement with the female mold; and means reacting between the stripper frame and mold mormally urges the stripper frame to a position flush with the web confronting face of the female mold and opposes axial withdrawal movement of the mold relative to the stripper frame.

8. In a differential pressure thermoforming machine having a frame; mold support assemblies, at least one of which is movable on the frame and carries a female mold having a plastic web confronting face, mounted for relative movement between a mold open and a mold closed position along an axis of movement; means for supporting a heated deformable synthetic plastic material between said mold support assemblies and adjacent the said mold face when the assemblies are in mold closed position; and a stripper element for the female mold for restraining the plastic material when the female mold is moved toward mold open position; the improvement wherein a first abutment is provided on the female mold support assembly and a second abutment is provided, the said abutments being in predetermined axially spaced position when the mold support assemblies are in mold closed position and moving into engagement when the said assemblies move relatively to mold open position, and one of said abutments is movable to normally restrain movement of the stripper element with the female mold and to release the stripper element to travel with the mold when the abutments engage.

9. The invention defined in claim 8 wherein one of said abutments includes a latch actuator and the other includes a latch, and a third abutment cooperating with the latch to function as a latch lock is provided on the frame.

10. For use in a differential pressure thermoforming machine having a frame; mold support assemblies mounted for relative movement thereon along an axis of movement between an open and a closed position; means for feeding a web of synthetic plastic material between the platen assemblies; and means for moving at least one of the said assemblies axially, the combination comprising:
 a female mold adapted to be mounted on the latter support assembly carrying a stripper element mounted for relative movement therewith;
 a first abutment;
 a second abutment adapted to be mounted on the said latter support assembly at a predetermined distance from the first abutment when the support assemblies are in closed position to engage the first abutment when the support assemblies are moved relatively to open position;
 one of said abutments including a latch connected to restrain movement of the stripper element with the mold when the mold is withdrawn and cooperating with the other abutment to release the stripper element to travel with the mold when the abutments engage.

11. The combination as set forth in claim 10 wherein a lock element is adapted to be carried by the frame in a position to cooperate with the latch to lock the stripper element to the frame when the support assemblies are in the mold closed position.

12. A method of aiding the stripping process in a differential pressure thermoforming machine having a frame, mold support assemblies mounted for relative movement thereon along an axis of movement between an open and closed position; mechanism for feeding a web of synthetic plastic between the mold support assemblies when the latter are in open position, power operated mechanism for moving at least one of the mold support assemblies axially and a female mold on the latter assembly carrying a stripper element mounted for relative movement therewith; the steps of:
 moving the female mold toward mold closed position and, as the mold approaches said position, latching the stripper element to the frame;
 differential pressurizing the plastic web to cause it to conform to the contour of the mold cavity;
 withdrawing the female mold from closed position while keeping the stripper element locked to the frame and thereby helping to strip the portion of the plastic web deformed into the mold cavity from the mold cavity; and
 after a predetermined interval engaging abutments on the mold support assembly and latch as the mold moves to open position to effect unlatching of the stripper element from the frame.

* * * * *